(12) United States Patent
Osawa et al.

(10) Patent No.: US 12,553,764 B2
(45) Date of Patent: Feb. 17, 2026

(54) COUNTING SCALE

(71) Applicant: A&D COMPANY, LIMITED, Tokyo (JP)

(72) Inventors: Toshihiko Osawa, Saitama (JP); Kazutaka Suga, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 293 days.

(21) Appl. No.: 18/231,758

(22) Filed: Aug. 8, 2023

(65) Prior Publication Data
US 2024/0068861 A1     Feb. 29, 2024

(30) Foreign Application Priority Data

Aug. 30, 2022   (JP) ................................ 2022-136776

(51) Int. Cl.
*G01G 19/42*     (2006.01)
*G01G 19/415*    (2006.01)
*G01G 21/28*     (2006.01)

(52) U.S. Cl.
CPC ........... *G01G 19/42* (2013.01); *G01G 19/415* (2013.01); *G01G 21/283* (2013.01)

(58) Field of Classification Search
CPC ..... G01G 19/415; G01G 19/42; G01G 21/283
See application file for complete search history.

(56) References Cited

U.S. PATENT DOCUMENTS

| 10,810,540 B1* | 10/2020 | Gopal ................... G01G 19/42 |
| 2022/0027840 A1 | 1/2022 | Li |
| 2022/0373385 A1* | 11/2022 | Thunhorst ............ G06V 10/751 |

FOREIGN PATENT DOCUMENTS

| JP | H0682297 A | * | 3/1994 |
| JP | H08-062030 A | | 3/1996 |
| JP | 2010-249606 A | | 11/2010 |
| JP | 2014102160 A | * | 6/2014 |

OTHER PUBLICATIONS

Machine translation of JP 2014102160 (Year: 2014).*

* cited by examiner

Primary Examiner — Natalie Huls
(74) Attorney, Agent, or Firm — Studebaker Brackett PLLC (57) ABSTRACT

A counting scale includes a weighing pan, a weighing sensor connected to the weighing pan, a storage unit including a registered data table storing, as registered data, a unique identification number, an article name, and a unit weight with respect to one article, an arithmetic processing unit configured to urge placement of one piece of the target article on the weighing pan, calculate a unit weighed value of the one piece of the target article from the weighing sensor, narrow down registered data including a unit weight within a predetermined range with respect to the unit weighed value as candidate data from the registered data table, and obtain sorted candidate data by selecting and sorting the candidate data in ascending order of absolute value of deviation from the unit weighed value, and a display unit configured to display the sorted candidate data.

6 Claims, 12 Drawing Sheets

| Identification No. | Article name | Unit weight (g) | Upper limit value | Lower limit value | Tare weight |
|---|---|---|---|---|---|
| 000001 | Spoon | 100.000 | | | |
| 000002 | Plate | 101.000 | | | |
| 000003 | ----- | ... | | | |
| 000004 | --- | ... | | | |
| 000005 | ------- | ... | | | |
| 000006 | ---- | ... | | | |
| 000007 | -- | ... | | | |
| 000008 | ----- | ... | | | |
| | | | | | |
| | | | | | |
| 000050 | Plate 1000 | 101.000 | 101.050 | 100.950 | 5.000 |
| | | | | | |
| | | | | | |
| | | | | | |
| 999999 | ------ | ... | | | |

| Identification No. | Article name | Unit weight (g) | Last counting date | Use frequency | Routine setting |
|---|---|---|---|---|---|
| 000001 | Spoon | 100.000 | 2022/8/1 | 500 | 1-50-70 |
| 000002 | Plate | 92.200 | 2020/6/30 | 12000 | ... |
| 000003 | ---- | ... | ... | ... | ... |
| 000004 | ---- | ... | ... | ... | ... |
| 000005 | ------ | ... | ... | ... | ... |
| 000006 | ---- | ... | ... | ... | ... |
| 000007 | -- | ... | | | |
| 000008 | ----- | ... | | | |
| | | | | | |
| 000050 | Plate 1000 | 101.000 | | | |
| | | | | | |
| 999999 | ------ | ... | | | |

COUNTING SCALE

TECHNICAL FIELD

The present invention relates to a counting scale that is a scale for counting the number of pieces of an article.

BACKGROUND ART

A counting scale is a scale for counting the number of pieces of an article, and is configured to register identification information of each article in a storage unit and a unit weight (weight of one piece) in advance, and divide a weighed value obtained when a plurality of pieces of the same registered kind of article are placed on a weighing pan by the unit weight to count the number of pieces of this article. Therefore, in the counting scale, an article unit weight registration operation is performed in advance, and a counting operation is performed by calling registered data of an article desired to be counted. Hereinafter, an article desired to be counted is referred to as a "target article."

For example, following methods for calling registered data are available.
  (i) Make a key input of an identification number of a target article.
  (ii) Make a key input of an article name of a target article.
  (iii) Scan a barcode of an identification number of a target article.

The method (iii) is described in Patent Literature 1.

CITATION LIST

Patent Literature

Patent Literature 1 Japanese Published Unexamined Patent Application No. H08-62030

SUMMARY OF INVENTION

Technical Problems

However, calling the registered data by the conventional methods is troublesome such that, in the case of (i) described above, it is troublesome to manage individual IDs of articles, and in the case of (ii) described above, it takes time to make a key input of an article name, and the case of (iii) has an inconvenience in which the method cannot be used when a target article has no barcode, and in particular, when registered data are of 50 or more articles, calling of each registered data reduces the counting operation efficiency.

An object of the present invention is to solve the problems described above, and improve the efficiency of calling of registered data in a counting scale.

Solution to Problem

In order to solve the problems described above, a counting scale according to a first aspect of the present invention includes a weighing pan on which a target article desired to be counted is placed, a weighing sensor connected to the weighing pan, a storage unit including a registered data table storing, as registered data, at least a unique identification number, an article name, and a unit weight with respect to one article, an arithmetic processing unit configured to urge placement of one piece of the target article on the weighing pan, calculate a unit weighed value of the one piece of the target article from the weighing sensor, narrow down registered data including a unit weight within a predetermined range with respect to the unit weighed value as candidate data from the registered data table, and obtain sorted candidate data by selecting and sorting the candidate data in ascending order of absolute value of deviation from the unit weighed value, and a display unit configured to call and display the sorted candidate data in descending order of search ranking.

In a counting scale according to a second aspect, in the first aspect, it is also preferable that the arithmetic processing unit is connected to an external storage unit including an external registered data table storing, as registered data, at least unique identification information and a unit weight with respect to one article, and narrows down registered data including a unit weight within a predetermined range with respect to the unit weighed value as candidate data from the external registered data table, and calls and displays the candidate data on the display unit in order of listing.

In a counting scale according to a third aspect, in the first aspect, it is also preferable that the arithmetic processing unit requests to add the target article to be placed on the weighing pan to the requested number of pieces when the unit weighed value is less than a calling lower limit value set in advance, defines an average unit weighed value obtained by dividing a total weighed value of the requested number of pieces of the target article by the requested number of pieces as the unit weighed value, and narrows down the candidate data from the registered data table.

In a counting scale according to a fourth aspect, in the second aspect, it is also preferable that the arithmetic processing unit requests to add the target article to be placed on the weighing pan to the requested number of pieces when the unit weighed value is less than a calling lower limit value set in advance, defines an average unit weighed value obtained by dividing a total weighed value of the requested number of pieces of the target article by the requested number of pieces as the unit weighed value, and narrows down the candidate data from the external registered data table.

In a counting scale according to a fifth aspect, in the first aspect, it is also preferable that the arithmetic processing unit further sorts the sorted candidate data in any one or a combination of reverse chronological order of the last counting date, descending order of use frequency, and order of routine setting.

In a counting scale according to a sixth aspect, in the second aspect, it is also preferable that the arithmetic processing unit further sorts the candidate data in any one or a combination of reverse chronological order of the last counting date, descending order of use frequency, and order of routine setting.

As a counting scale according to a seventh aspect, in any of the first, third, and fifth aspects, it is also preferable that the storage unit includes a hash table storing a hash value obtained by hashing a numerical value of the unit weight by linking the hash value to the registered data table by the identification number, and the arithmetic processing unit narrows down the candidate data by using a hash value obtained by hashing the unit weighed value by the same hash function as in the hash table.

As a counting scale according to an eighth aspect, in any of the second, fourth, and sixth aspects, it is also preferable that the external storage unit includes a hash table storing a hash value obtained by hashing a numerical value of the unit weight by linking the hash value to the external registered data table by the identification information, and the candidate data are narrowed down by using a hash value obtained by hashing the unit weighed value by the same hash function as in the hash table.

Advantageous Effect of Invention

According to the present invention, calling of registered data in a counting scale can be improved in efficiency.

DESCRIPTION OF EMBODIMENTS

Next, preferred embodiments of the present invention will be described based on the drawings.

First Embodiment (Description of Configuration)

Figure 1:
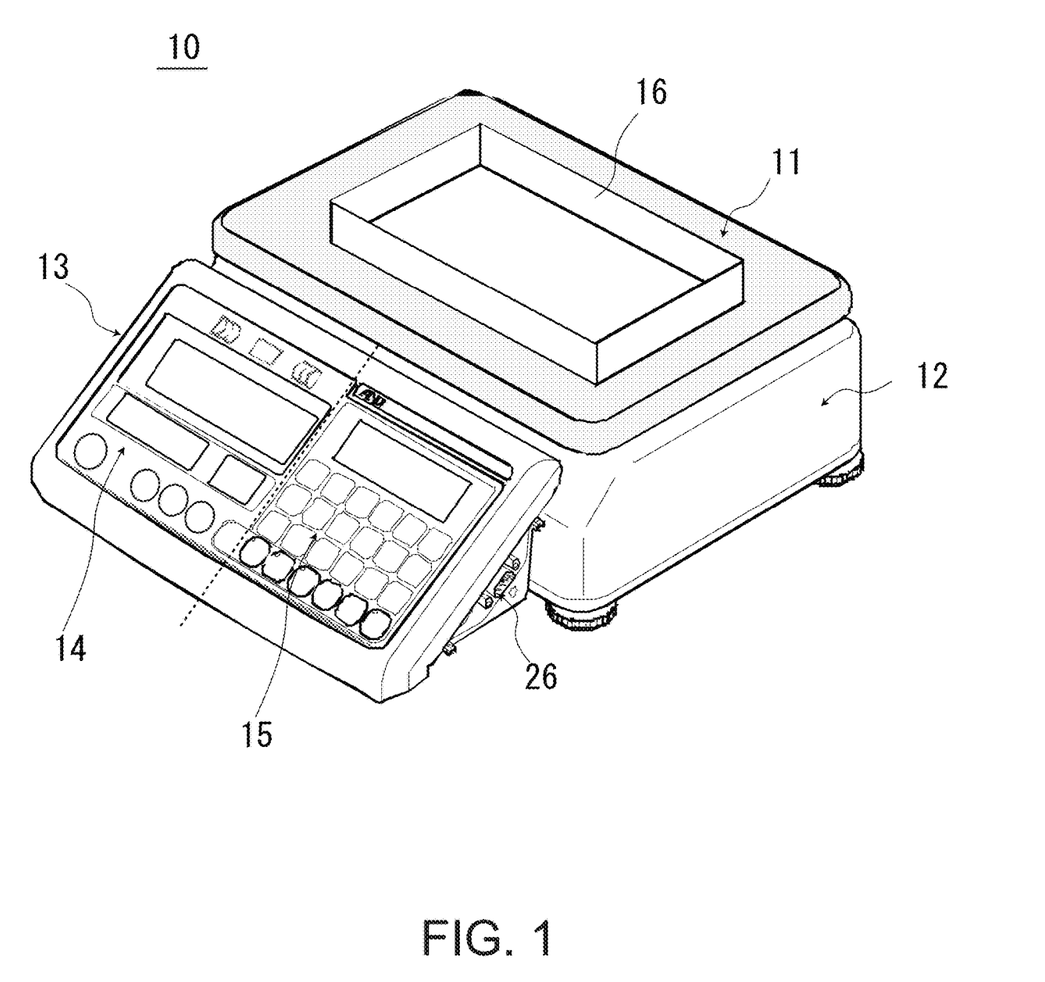
FIG. 1 is a front perspective view of a counting scale according to a first embodiment of the present invention.

FIG. 1 is a front perspective view of a counting scale 10 according to a first embodiment of the present invention. The counting scale 10 includes a weighing pan 11, a scale main body 12, and a front panel 13. On the weighing pan 11, a tare container 16 in which a target article is put may be placed. On the front panel 13, at the left side from the center (indicated by a dashed line), there are many elements to be used mainly for a counting operation, so that the left side is referred to as a counting operation panel 14, hereinafter. At the right side from the center, there are many elements to be used mainly for a unit weight registration operation, so that the right side is referred to as a registration operation panel 15, hereinafter. The front panel 13 includes a connector group 26 including at least an RS-232C connector, a USB connector, and an SD slot on a side surface, and to the connector group 26, an external storage unit 34 (illustrated in FIG. 3 described later) is connected. The front panel 13 can be disposed separately from the scale main body 12 by an RS-232C or USB cable, and a keyboard, a barcode reader, and a printer (all of these are not illustrated) can be connected to the front panel 13 by an RS-232C or USB cable.

Figure 2:
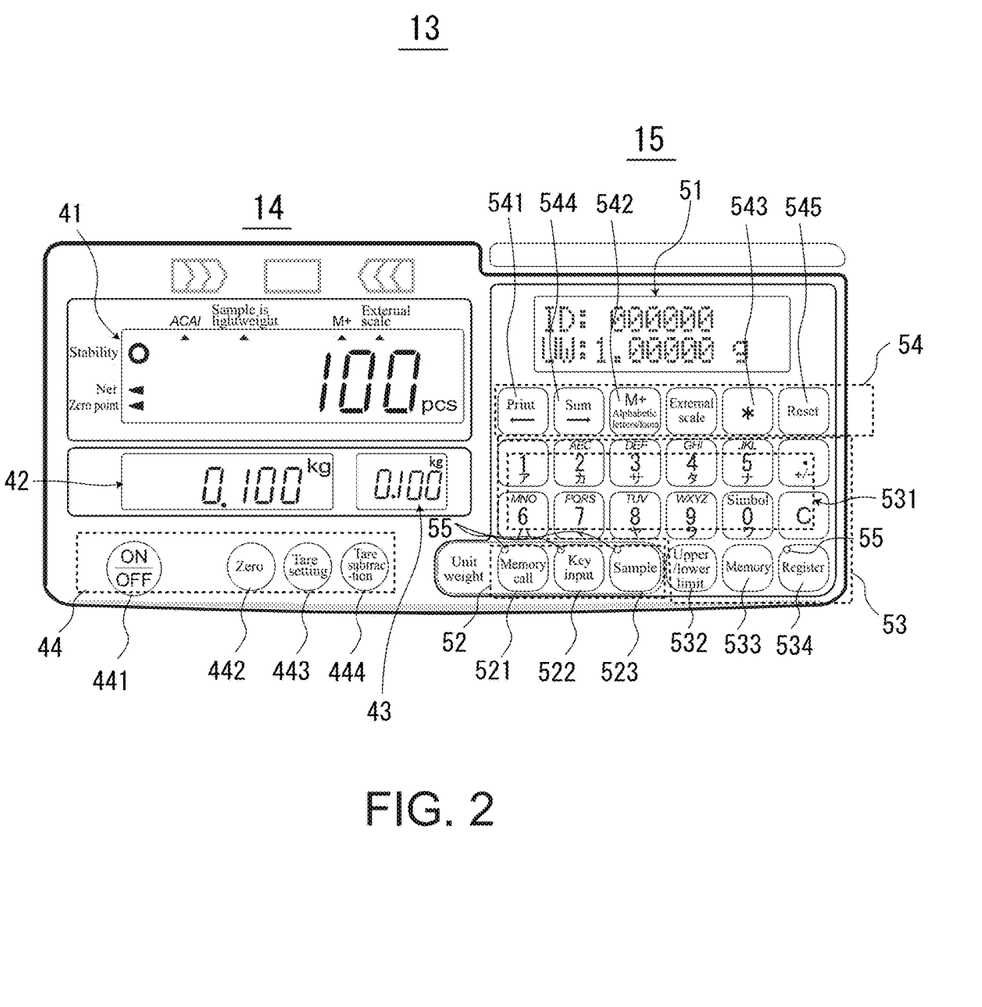
FIG. 2 is a front view of a front panel of the counting scale according to the first embodiment.

FIG. 2 is a front view of the front panel 13 of the counting scale 10. The counting operation panel 14 includes a number-of-pieces display unit 41, a weight display unit 42, a unit weight display unit 43, and a counting operation key group 44. Each of the display units 41, 42, and 43 is a liquid crystal or organic EL display, and when a target article is placed on the weighing pan 11, a weight of all pieces of the target article placed on the weighing pan 11 is displayed on the weight display unit 42, a registered unit weight of the target article is displayed on the unit weight display unit 43, and the number of pieces of the target article is displayed on the number-of-pieces display unit 41. The counting operation key group 44 includes a power supply key 441, a zero key 442, a tare setting key 443, and a tare subtraction key 444. The power supply key 441 is used to turn ON/OFF the power supply. The zero key 442 is used to set a zero point of the scale. The tare subtraction key 444 is used to subtract a tare weight of the tare container 16, etc. The tare setting key 443 is used to set a tare weight with a numeric keypad 531 (described later).

The registration operation panel 15 includes a content display unit 51, a primary key group 52, a registration operation key group 53, and a function key group 54. The content display unit 51 is a display similar to the display units 41, 42, and 43, and displays information on an operation content. The primary key group 52 includes a memory call key 521, a key-input key 522, and a sample input key 523.

The primary key group 52 is a key group that is pressed first to set a unit weight necessary for a counting operation when the power supply key 441 is pressed. For guidance, these keys 521, 522, and 523 are configured to make LED lamps 55 flash. The key-input key 522 is for setting (registering) a unit weight from the numeric keypad 531 (described later). The sample input key 523 is for setting (registering) a weighed value of a sample as a unit weight by defining an article (single or plural in number) placed on the weighing pan 11 as the "sample." The memory call key 521 is for "calling" registered data of the target article from data stored (registered) in the storage unit 24, 34 described later and setting a unit weight. In addition to the following conventional callings (i) to (iii), the memory call key 521 performs calling (iv). These will be described in detail later.

(i) Calling by key input of identification number
(ii) Calling by article name
(iii) Calling by barcode of identification number
(iv) Weighing identification calling The registration operation key group 53 includes the numeric keypad 531, an upper/lower limit key 532, a memory key 533, and a registration key 534, and the keys 531, 532, 533, and 534 are used for unit weight setting. With the numeric keypad 531, numerical values, roman letters, kana characters, and symbols can be input and cleared. With the upper/lower limit key 532, upper and lower limit values for a comparator function (a function to compare, at the time of a counting operation, the number of pieces or a weight with a set upper or lower limit value, and display a comparison result as a level such as "HI," "OK," or "LO") are set. With the memory key 533, input contents (an identification number, a unit weight, an article name, and upper and lower limit values) are displayed on the content display unit 51 for confirmation of contents to be stored in the storage unit 24. With the registration key 534, the contents checked with the memory key 533 are stored (registered) in the storage unit 24, 34. The registration key 534 also makes a guidance by flashing an LED lamp 55 so as to be prevented from being forgotten to be pressed.

The function key group 54 includes a print key 541 that enables outputting to a printer, an addition key 542 and a subtraction key 543 for a summing function (function to obtain a cumulative sum of counted numbers of pieces at the time of a counting operation), a sum key 544 to confirm a sum total and the number of additions in the summing function, and a reset key 545 for initializing input contents at the time of a registration operation and initializing a weighing state at the time of a counting operation. The print key 541 and the sum key 544 also function as a forward key and a return key of display when the memory call key 521 is pressed (therefore, hereinafter, the print key 541 and the sum key 544 are also referred to as a forward key 541 and a return key 544). The addition key 542 also functions to change the numeric keypad 531 into alphabetic letters/kana/symbol input keys at the time of a registration operation. The subtraction key 543 also functions as a switch key to switch the display on the content display unit 51 (refer to FIG. 2) between a combination of an identification number (ID) and a unit weight (UW), and a combination of an article name (IC) and a unit weight (UW).

Figure 3:
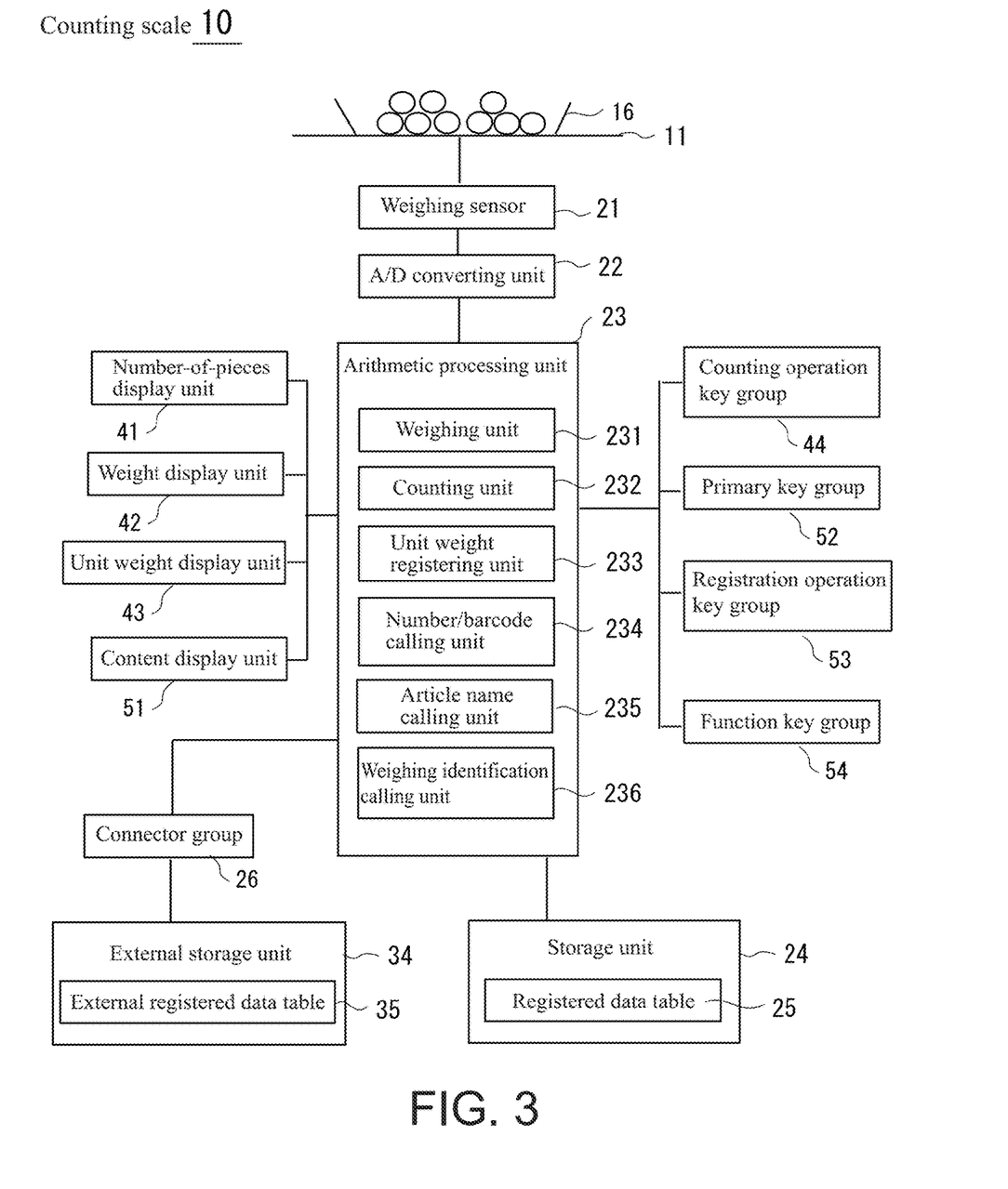
FIG. 3 is a functional configuration block diagram of the counting scale according to the first embodiment.

FIG. 3 is a functional configuration block diagram of the counting scale 10. The counting scale 10 includes the weighing sensor 21, an A/D converting unit 22, the arithmetic processing unit 23, the storage unit 24, the connector group 26, the external storage unit 34, the display units 41, 42, 43, and 51, and the key groups 44, 52, 53, and 54.

The weighing sensor 21 is connected to the weighing pan 11, and a load applied to the weighing pan 11 is transmitted to and detected by the weighing sensor 21. As the weighing sensor 21, an electronic balance type, strain gauge type, or capacitance type sensor may be used. An analog signal detected by the weighing sensor 21 is converted into a digital load signal by the A/D converter 22, and output to the arithmetic processing unit 23.

Figure 4:
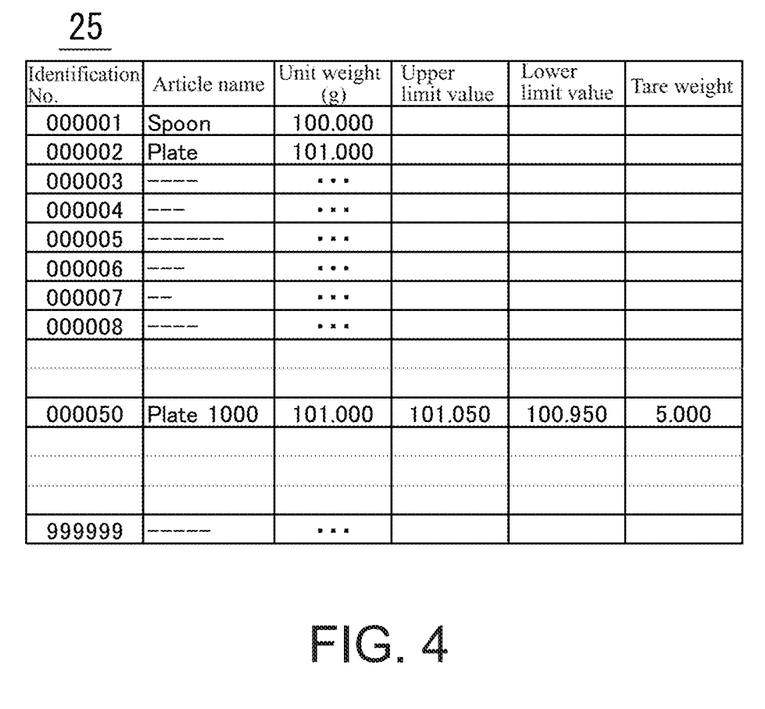
FIG. 4 illustrates a configuration example of a registered data table of the counting scale according to the first embodiment.

The storage unit 24 is a semiconductor memory such as a RAM (Random Access Memory) or flash memory, and is housed inside the front panel 13 and connected to the arithmetic processing unit 23. The storage unit 24 stores various programs for arithmetic operations of the respective functional units (described later) of the arithmetic processing unit 23, and includes a registered data table 25. FIG. 4 illustrates a configuration example of the registered data table 25. In the registered data table 25, 1000 articles can be registered, and with respect to one article, a unique identification number (number among 000001 to 999999), an article name, and a unit weight are stored. Specifically, as illustrated in FIG. 4, with respect to an identification number "000001," an article name "Spoon" and a unit weight "100.000 g," and with respect to an identification number "000002," "Plate" and a unit weight "101.000 g," are stored (registered). When upper and lower limit values and a tare weight are set, for example, as in the identification number "000050" in FIG. 4, an article name "Plate 1000," a unit weight "101.000 g," an upper limit value "101.0500 g," a lower limit value "100.950 g," and a tare weight "5.000 g" are stored (registered). The registered data table 25 is created in a unit weight registering unit 233 described later.

The external storage unit 34 is a storage medium, for example, an SD card, a USB memory, a portable SSD (Solid State Drive), or an HDD (Hard Disc Drive) or an optical disc, and is connected externally to the arithmetic processing unit 23 from the connector group 26. The external storage unit 34 includes an external registered data table 35 storing, with respect to one article, at least unique identification information (identification information consisting of any or a combination of numbers, alphabetic letters, and kana characters. An identification number and an article name are included in this information.) and a unit weight. The external registered data table 35 is mainly created by a personal computer or the like not illustrated. As in the registered data table 25, when upper and lower limit values and a tare weight are stored in the external registered data table 35, these are also read from the external registered data table 35.

The arithmetic processing unit 23 is a microcontroller configured by mounting, for example, a CPU (Central Processing Unit), a ROM (Read Only Memory), and a RAM, etc., on an integrated circuit. The arithmetic processing unit 23 includes a weighing unit 231, a counting unit 232, the unit weight registering unit 233, a number/barcode calling unit 234, an article name calling unit 235, and a weighing identification calling unit 236. These functional units 231, 232, 233, 234, 235, and 236 are configured by electronic circuits such as a CPU, ASIC (Application Specific Integrated Circuit), PLD (Programmable Logic Device) such as FPGA (Field Programmable Gate Array).

The weighing unit 231 displays a weighed value (weight) of all pieces of a target article placed on the weighing pan 11 on the weight display unit 42 based on a load signal from the weighing sensor 21. The counting unit 232 counts the number of pieces of the target article placed on the weighing pan 11 by dividing a weighed value of all pieces of the target article by a unit weight of the target article, and displays the counted number on the number-of-pieces display unit 41.

At the time of a registration operation, in response to the key-input key 522, when a value of a unit weight of an article is input from the numeric keypad 531, and when a weighed value of a sample of the article is input as a unit weight with the sample input key 523, the unit weight registering unit 233 associates an article name of the article with the unit weight, for example, associates an article name "Spoon" with a unit weight "100.000 g" and assigns an unused identification number to these, and registers them in the registered data table 25 of the storage unit 24. When upper and lower limit values of the article are input with the upper/lower limit key 532 and a weight of the tare container 16 is input with the tare setting key 443, the unit weight registering unit 233 also registers these values in association with each other.

The number/barcode calling unit 234, the article name calling unit 235, and the weighing identification calling unit 236 function when the memory call key 521 is pressed, and calls registered data of a target article to be counted. The number/barcode calling unit 234 functions when an identification number is input from the numeric keypad 531 or when a barcode of the identification number is scanned with the barcode reader at the time of a counting operation, and calls registered data of a corresponding article from the registered data table 25 (or the external registered data table 35). That is, (i) calling by a key input of an identification number and (iii) calling by a barcode of the identification number are performed by the above-described memory call key 521. At the time of a counting operation, the article name calling unit 235 functions when an article name is input from the numeric keypad 531, and calls registered data of a corresponding article from the registered data table 25

(or the external registered data table 35). That is, (ii) calling by an article name is performed by the above-described memory call key 521.

However, in the case of calling (i), the number of articles whose individual IDs can be stored in the storage unit 24 is 1000, and the number of articles whose IDs can be stored in the external storage unit 34 is not limited, so that ID management is troublesome, and in the case of calling (ii), it takes time to make a key input of an article name, and calling (iii) cannot be used when a target article has no barcode. Therefore, the weighing identification calling unit 236 also performs new calling (iv): weighing identification calling. Weighing identification calling will be described based on FIG. 5 later.

(Description of Operation)

Next, operation for a counting operation of the counting scale 10 will be described. As the power supply key 441 is pressed, three LED lamps 55 of the memory call key 521, the key-input key 522, and the sample input key 523 of the primary key group 52 flash and urge setting of a unit weight of a target article.

When the key-input key 522 or the sample input key 523 is pressed, the above-described unit weight registering unit 233 functions, and a unit weight is set by a key input or from a value of a sample and registered, and then a counting operation is entered. When the memory call key 521 is pressed, before entering the counting operation, registered data is called. When an identification number is scanned with the barcode reader, the number/barcode calling unit 234 functions, and when an input is made from the numeric keypad 531, the article name calling unit 235 or the number/barcode calling unit 234 functions. Here, when the weighing unit 231 receives a load signal, the weighing identification calling unit 236 functions and calls a target article from the registered data table 25 (or the external registered data table 35) by weighing identification calling illustrated in FIG. 5.

Figure 5:
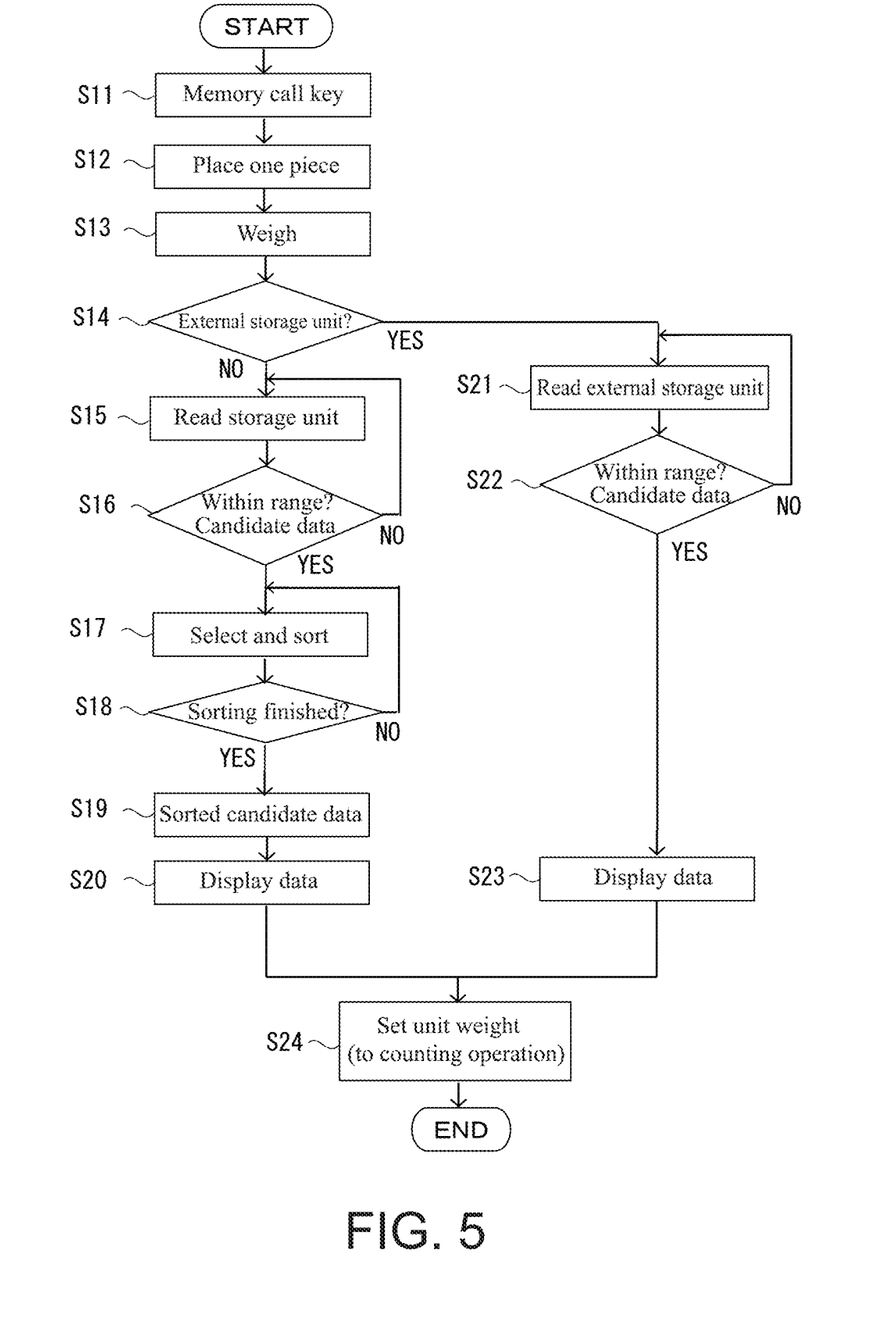
FIG. 5 is an operation flowchart of weighing identification calling of the counting scale according to the first embodiment.

FIG. 5 is an operation flowchart of weighing identification calling of the counting scale 10 according to the first embodiment. First, in Step S11, an operator presses the memory call key 521 following the power supply key 441. Then, unless the number/barcode calling unit 234 and the article name calling unit 235 start, the weighing identification calling unit 236 functions. Alternatively, when an "automatic mode" is set in advance in the counting scale 10, after the power supply is turned ON, without pressing the memory call key 521, the weighing identification calling unit 236 automatically functions, and the processing immediately shifts to Step S12.

Next, in Step S12, the weighing identification calling unit 236 instructs the operator to place "one piece" of the target article on the weighing pan 11 through the content display unit 51 (instructs the operator to place it after pressing the tare subtraction key 444 when there is a tare container 16). When the operator places one piece of the target article on the weighing pan 11, the processing shifts to Step S13, and the weighing unit 231 functions and calculates a weighed value of the one piece of the target article (hereinafter, referred to as a "unit weighed value"). Next, the processing shifts to Step S14, and the weighing identification calling unit 236 detects whether the external storage unit 34 has been connected. When the external storage unit 34 is not connected (No), the processing shifts to Step S15, and when the external storage unit 34 is connected (Yes), the processing shifts to Step S21.

As the processing shifts to Step S15, the weighing identification calling unit 236 reads the registered data table 25 in the storage unit 24. The processing shifts to Step S16, and the weighing identification calling unit 236 narrows down registered data including a unit weight within a predetermined range with respect to the unit weighed value of the target article (within ±5%, etc., with respect to the unit weighed value of the target article). After completion of narrowing down of all registered data, data narrowed down in this step are defined as "candidate data," and the processing shifts to Step S17.

Figure 6A:
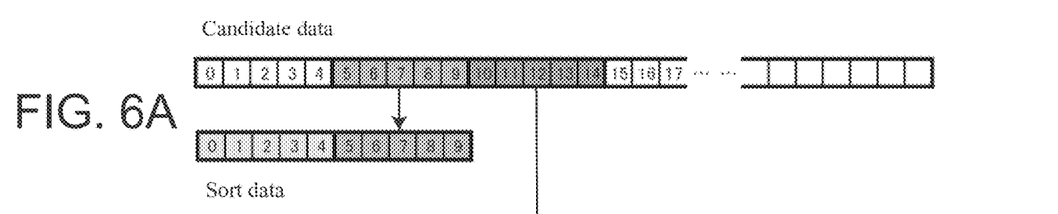
FIGS. 6A, 6B, 6C, 6D, and 6E are operation image views of weighing identification calling of the counting scale according to the first embodiment.
Figure 6B:
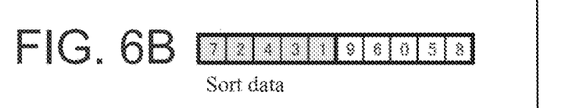
Figure 6C:
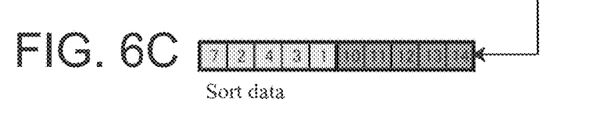
Figure 6D:
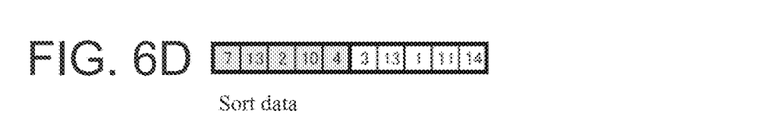
Figure 6E:
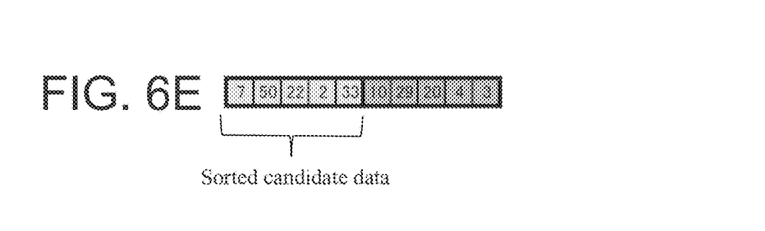

In Step S17, the weighing identification calling unit 236 selects and sorts candidate data in ascending order of absolute value of deviation from the unit weighed value of the target article. The selection and sorting will be described by using a detailed example illustrated in FIGS. 6A to 6E. The weighing identification calling unit 236 defines the number of searches as n (n: natural number), and the number of swaps as α (α: α≤natural number n). FIGS. 6A to 6E illustrate sorting by identification number when n=5 and α=5. In Step S17, the weighing identification calling unit 236 prepares n+α sort data, copies n+α elements to sort data from the candidate data (FIG. 6A), and sorts the (n+α) sort data (FIG. 6B). Next, leading n elements of the sort data are left, next α elements are copied from the candidate data (FIG. 6C), and the (n+α) sort data are sorted (FIG. 6D). Next, the processing shifts to Step S18, and the weighing identification calling unit 236 checks whether all elements of the candidate data have been completely sorted. When all elements are not completely sorted (No), Step S17 is repeated. When all elements are completely sorted (Yes), the processing shifts to Step S19, and leading top n elements in search ranking are obtained as "sorted candidate data" (FIG. 6E).

Figure 7:
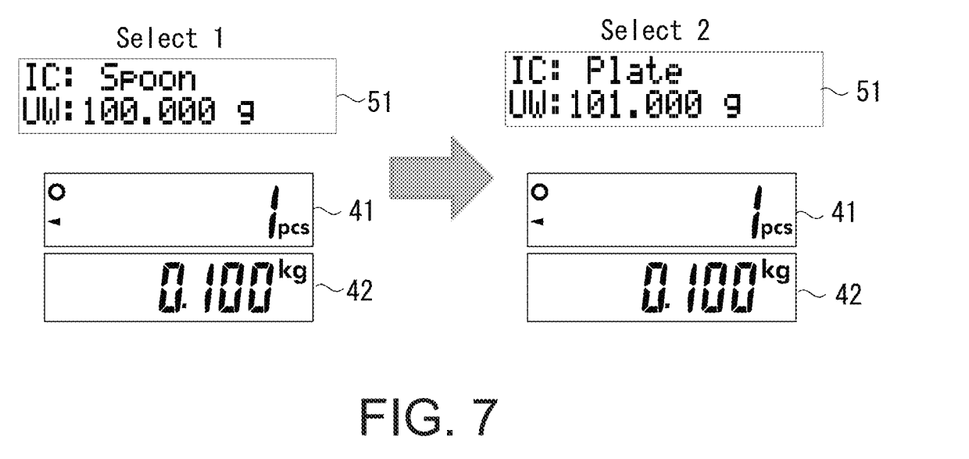
FIG. 7 illustrates a result display example of weighing identification calling of the counting scale according to the first embodiment.

The processing shifts to Step S20, and as illustrated in FIG. 7, from the n sorted candidate data, the weighing identification calling unit 236 calls and displays, for each article, the number of pieces on the number-of-pieces display unit 41, the unit weighed value on the weight display unit 42, and the article name and the unit weight in the called registered data on the content display unit 51 in descending order of search ranking. The display can be scrolled with the forward key 541 and the return key 544. Then, the processing shifts to Step S24, and the weighing identification calling unit 236 determines (sets) calling of a unit weight of a target article corresponding to an article at which the display scrolling (moving) is stopped, and can enter a counting operation.

On the other hand, when the processing shifts from Step S14 to Step S21, the weighing identification calling unit 236 reads the external registered data table 35 in the external storage unit 34. The processing shifts to Step S22, and the weighing identification calling unit 236 narrows down registered data including a unit weight within a predetermined range with respect to a unit weighed value of the target article (±5%, etc., with respect to the unit weighed value of the target article). In the case of the external storage unit 34, the number of articles of the registered data is unknown, so that the weighing identification calling unit 236 does not perform selection and sorting, and after completion of narrowing down of all registered data, data narrowed down in this step are defined as "candidate data," and the processing shifts to Step S23. In Step S23, the weighing identification calling unit 236 transmits and displays the candidate data on the number-of-pieces display unit 41, the weight display unit 42, and the content display unit 51 in order of correspondence to a candidate (in order of listing) as illustrated in FIG. 7. Then, the processing shifts to Step S24, and the weighing identification calling unit 236 determines (sets) calling of a unit weight of a target article corresponding to an article at which the display scrolling (moving) is stopped, and can enter a counting operation.

As described above, according to the counting scale 10 of the present embodiment, the counting scale has the "weighing identification calling" function, so that just by placing one piece of a target article to be counted on the scale (counting scale 10), candidates of registered data of the target article are automatically called. Therefore, even when the number of articles of the registered data is large, corresponding data can be immediately found, so that the counting operation efficiency is improved. In addition, in "weighing identification calling," registered data can be called in response to the presence of just one piece of the target article, so that it is not necessary to prepare an identification ID table or a keyboard.

With the counting scale 10 of the present embodiment, not only registered data in the storage unit 24, registered data in the external storage unit 34 can also be used, so that according to each of the storage unit 24 and the external storage unit 34, efficient calling processing can be performed.

Second Embodiment

In a second embodiment, the following problem is accordingly responded to when it occurs in "weighing identification calling." For example, among small components such as a washer, there is a component whose single weight (unit weight) is as lightweight as 0.05 g, and for example, in the case where the minimum display (minimum unit to be displayed on the display unit) of the counting scale 10 is 0.01 g, when a weighing error of 10% occurs due to a change in the surrounding environment or an internal drift, a weighed value may be calculated as 0.06 g with respect to the unit weight of 0.05 g. In such a case, due to the influence from the weighing error, candidates of registered data of the target article may not be correctly narrowed down. In preparation for this problem, in the second embodiment, "total quantity confirmation" is added to the operation flow of the first embodiment.

Figure 8:
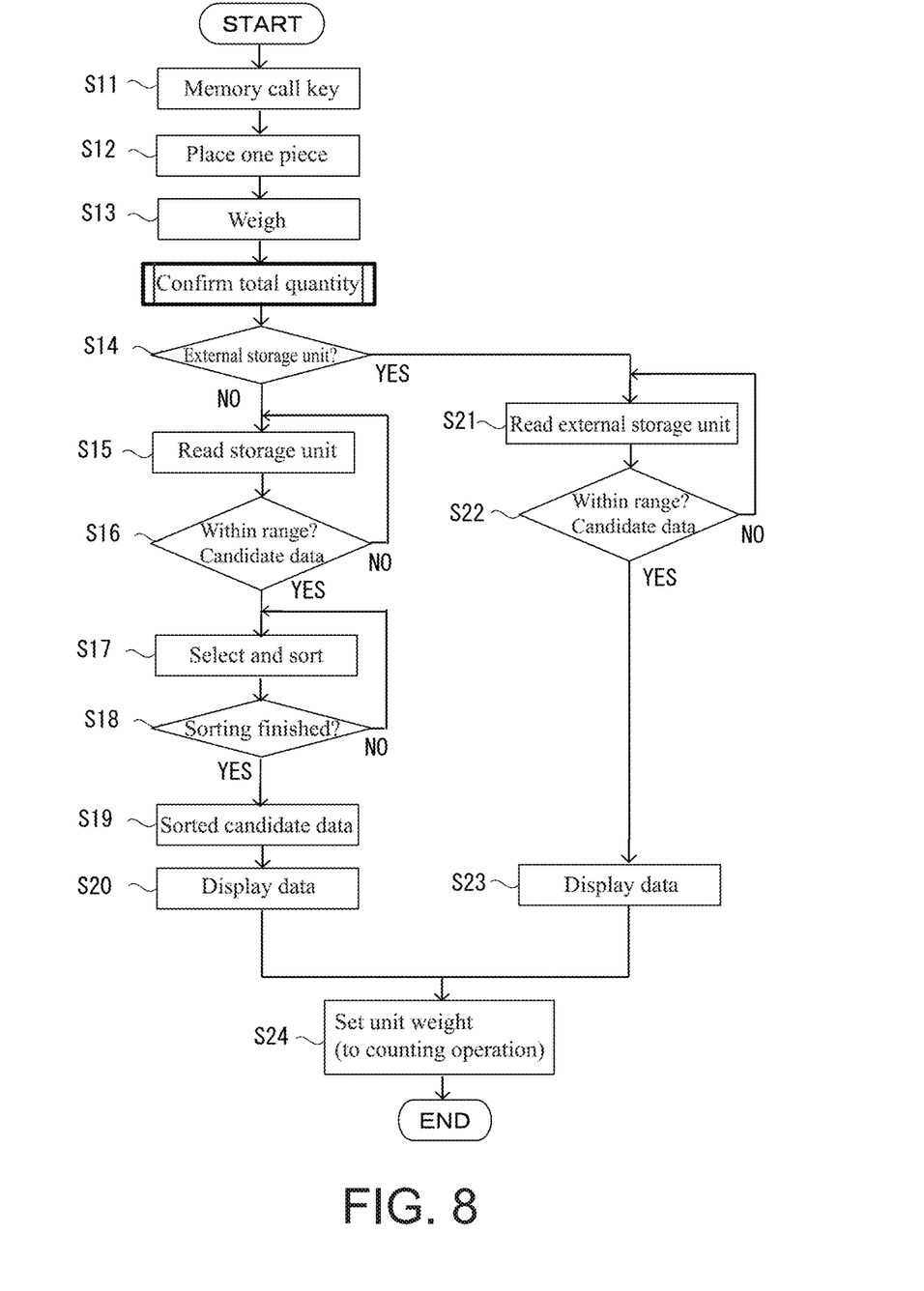
FIG. 8 is an operation flowchart of weighing identification calling of a counting scale according to a second embodiment.
Figure 9:
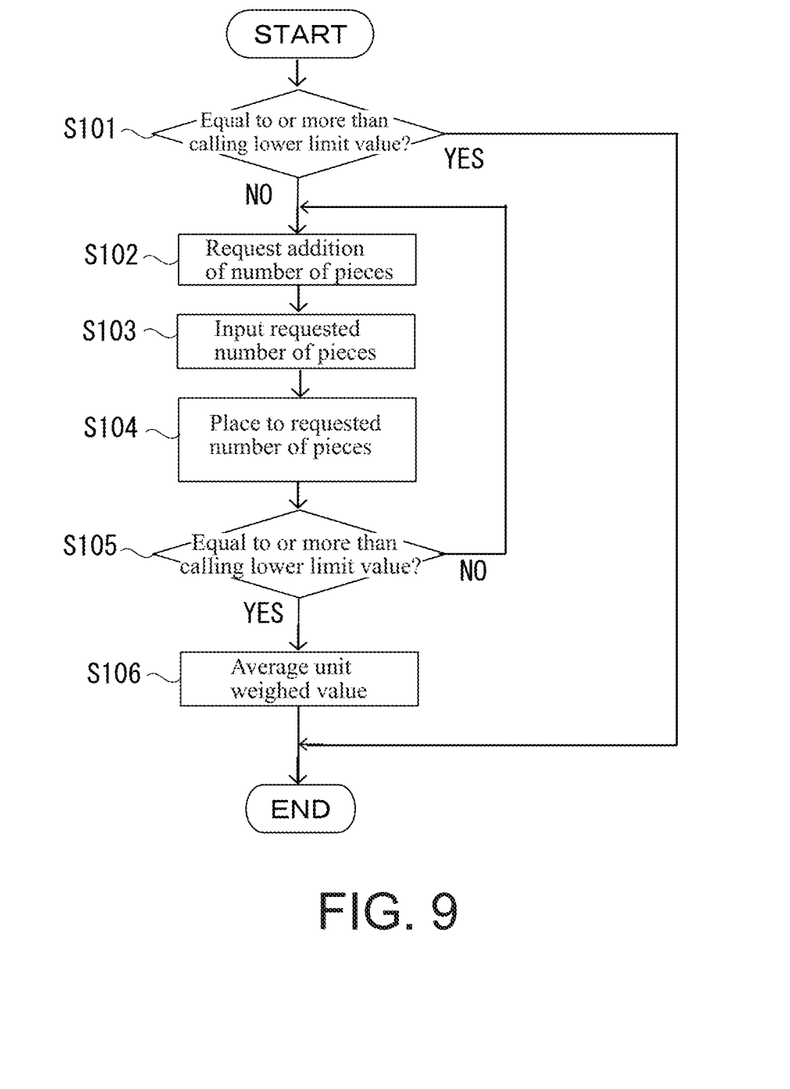
FIG. 9 is an operation flowchart of total quantity confirmation of the counting scale according to the second embodiment.

The configuration of the counting scale 10 according to the second embodiment is the same as in FIGS. 1 and 2 of the first embodiment. FIG. 8 is an operation flowchart of weighing identification calling of the counting scale 10 according to the second embodiment, and for the same operation as in FIG. 5 of the first embodiment, the same step number is used. In the second embodiment, after "one piece" of a target article is placed on the weighing pan 11 in Step S12 and a unit weighed value is calculated in Step S13, "total quantity confirmation" is performed. FIG. 9 is an operation flowchart of total quantity confirmation of the counting scale 10 according to the second embodiment.

As the total quantity confirmation is started, the processing shifts to Step S101, and the weighing identification calling unit 236 confirms whether a unit weighed value of the target article (one piece) is equal to or more than a calling lower limit value set in advance according to the minimum display of the weight display unit 42. When the unit weighed value is equal to or more than the calling lower limit value (Yes), the total quantity confirmation is ended, and it is judged that the acquired unit weighed value is a unit weight of the target article (one piece), and the processing returns to Step S14 (FIG. 8), and based on this unit weight, registered data is read.

On the other hand, when the unit weighed value is less than the calling lower limit value (No), the weighing identification calling unit 236 shifts the processing to Step S102, and requests the operator to add the number of pieces of the target article through the content display unit 51. The processing shifts to Step S103, and the operator inputs the number of pieces to be added (hereinafter, referred to as "requested number of pieces"). As the requested number of pieces, the operator selects a number from options such as 5/10/25/50/100 pieces displayed on the content display unit 51 by using the forward key 541 and the return key 544, or inputs an arbitrary value from the numeric keypad 531. The processing shifts to Step S104, and the operator adds the target article to the requested number of pieces onto the weighing pan 11, and presses the registration key 534. The processing shifts to Step S105, and the weighing identification calling unit 236 checks whether a weighed value of the target article (requested number of pieces) is equal to or more than the calling lower limit value. When the weighed value is less than the calling lower limit value (No), the processing returns to Step S102, and addition of the requested number of pieces is requested. When the weighed value is equal to or more than the calling lower limit value (Yes), the processing shifts to Step S106, and the total weighed value of the target article (requested number of pieces) is divided by the requested number of pieces to obtain an average unit weighed value of the target article (one piece), and the total quantity confirmation is ended. Then, the processing returns to Step S14 (FIG. 8), and based on the average unit weighed value, registered data is read.

As described above, according to the counting scale 10 of the present embodiment, the "total quantity confirmation" is added to the "weighing identification calling" function, so that it is possible to respond to an influence from a weighing error caused when the weight of only one piece of the target article is excessively small, and make "weighing identification calling" properly function (properly narrow down the target article).

Third Embodiment

In the third embodiment, in "weighing identification calling," the following problem is accordingly responded to when it occurs. An upper limit number of articles of registered data in the storage unit 24 is 1000, and by the above-described selection and sorting, close candidates can be quickly displayed. However, an upper limit number of articles of registered data in the external storage unit 34 is unknown, so that candidates within a predetermined range with respect to a unit weighed value of a target article are just displayed in order of listing. For example, there are a huge number of types of machine screws which are categorized depending on whether they have coarse threads or fine threads, categorized by the screwhead shape (pan head, countersunk, round, flat, binding-head, etc.), material (trivalent chromate, nickel, zinc, stainless steel, etc.), or depending on whether surface treatment has been applied, so that, just by narrowing down data within a predetermined range with respect to the unit weighed value, lots of articles are listed, and registered data of the target article may not be quickly displayed. Further, such components are managed by model number in many cases, and based on article names and unit weights similar to each other, when candidate data of, for example, "article name: machine screw A-1534, unit weight: 1.20000 g" and "article name: machine screw A-1543, unit weight: 1.21000 g" are listed, the operator may erroneously select data. In preparation for this problem, in the third embodiment, "additional sorting" is added to the operation flow in the first or second embodiment.

Figure 10:
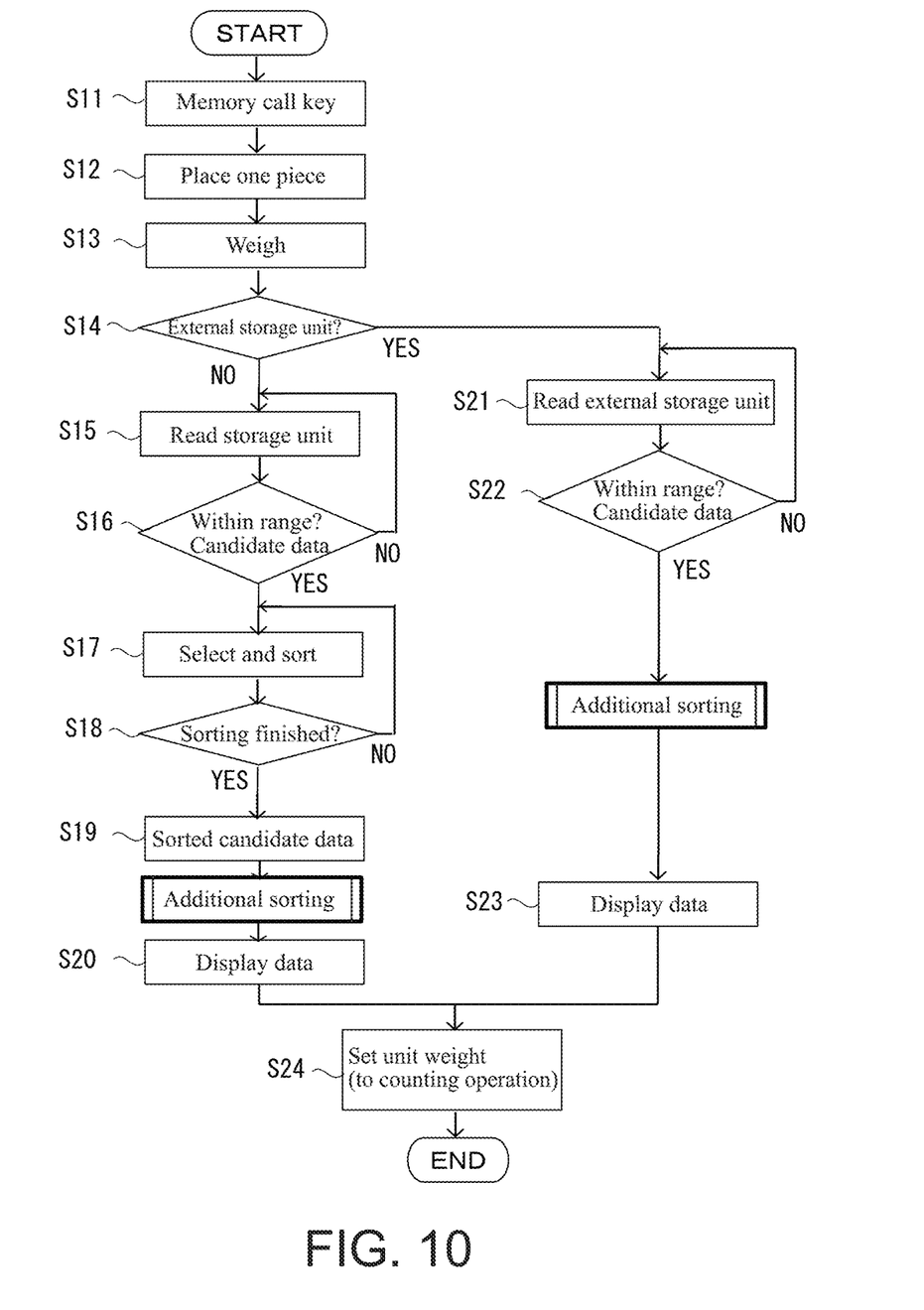
FIG. 10 is an operation flowchart of weighing identification calling of a counting scale according to a third embodiment.

The configuration of the counting scale 10 according to the third embodiment is the same as in FIGS. 1 and 2 of the first and second embodiment. FIG. 10 is an operation flowchart of weighing identification calling of the counting scale 10 according to the third embodiment, and for the same operation as in FIG. 5 of the first embodiment and FIG. 8 of the second embodiment, the same step number is used. In the third embodiment, in Step S22, when candidate data within a predetermined range with respect to a unit weighed value of a target article is narrowed down from the registered data of the external storage unit 34, "additional sorting" is performed. "Additional sorting" is performed based on at least any one or a combination of the following three items.

(1) Last counting date
(2) Use frequency
(3) Routine setting

Figure 11:
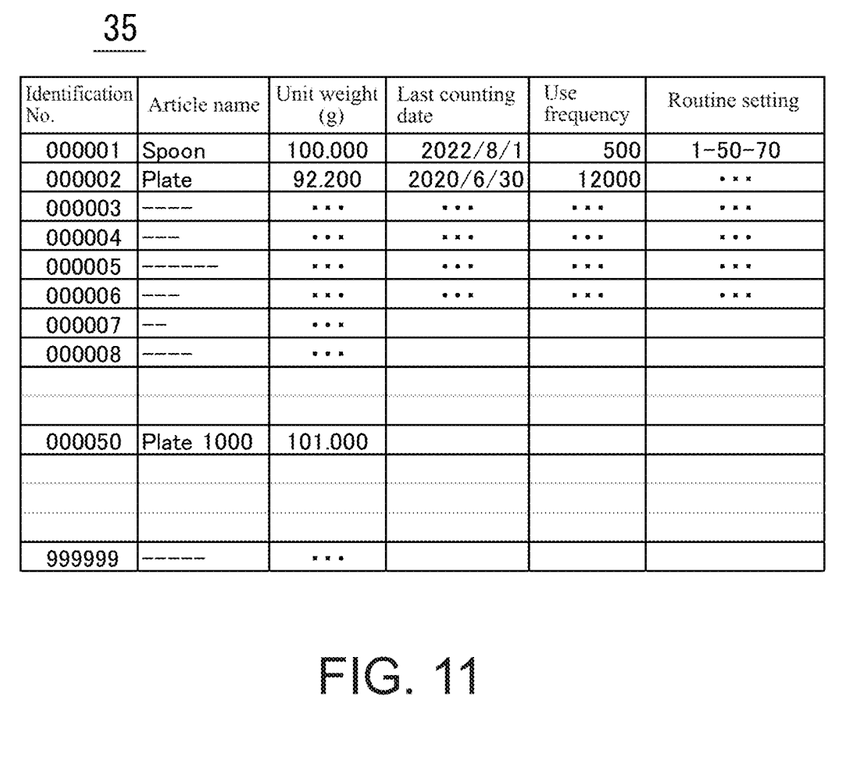
FIG. 11 illustrates a configuration example of an external registered data table adapted to the counting scale according to the third embodiment.

FIG. 11 illustrates a configuration example of an external registered data table 35 adapted to the counting scale 10 according to the third embodiment. In the external registered data table 35 adapted to the present embodiment, in addition to an identification number, an article name, a unit weight, (upper/lower limit values), and (tare weight), a last counting date, use frequency, and routine setting are stored (registered). As the last counting date, when a unit weight of a target article is set in a counting operation (Step S24), a date and time of this setting are registered or updated. Similarly, as the use frequency, when a unit weight of a target article is set in the counting operation (Step S24), the count of use frequency is updated by being incremented by one. The routine setting is registered in advance by an operator, and is created from a personal computer or the like not illustrated, or set from the registration operation key group 53. The routine setting is useful when the counting operation has a serial flow, and for example, setting is made by inputting article names "Screw A→Washer B→Nut C," or identification numbers "1→50→70."

In Step S22 in FIG. 10, when candidate data are narrowed down from the registered data in the external storage unit 34, the weighing identification calling unit 236 further sorts the candidate data based on the last counting date, use frequency, or routine setting. Which sorting is to be applied can be selected (multiple selections can be made) by the operator in a check box displayed on the content display unit 51 by using the forward key 541, the return key 544 and the registration key 534. When sorting by the last counting date is selected, candidate data are sorted in reverse chronological order of the last counting date. When sorting by the use frequency is selected, candidate data are sorted in descending order of use frequency. When sorting by routine setting is selected, candidate data are sorted in order of routine.

As described above, according to the counting scale 10 of the present embodiment, "additional sorting" based on the last counting date, the use frequency, or routine setting, is added to the "weighing identification calling" function, so that an article that is frequently used is displayed first, and calling of registered data in the external storage unit 34 is improved in efficiency.

The present embodiment is particularly effective when the external storage device 34 is provided, and is also effective when the number of searches n to be selected and sorted from the internal storage unit 24 is set to be large. In this case, as in FIG. 11, the last counting date, use frequency, and routine setting are also stored (registered) in the registered data table 25, and as illustrated in FIG. 10, additional sorting of sorted candidate data after Step S19 is useful.

Fourth Embodiment

Figure 12:
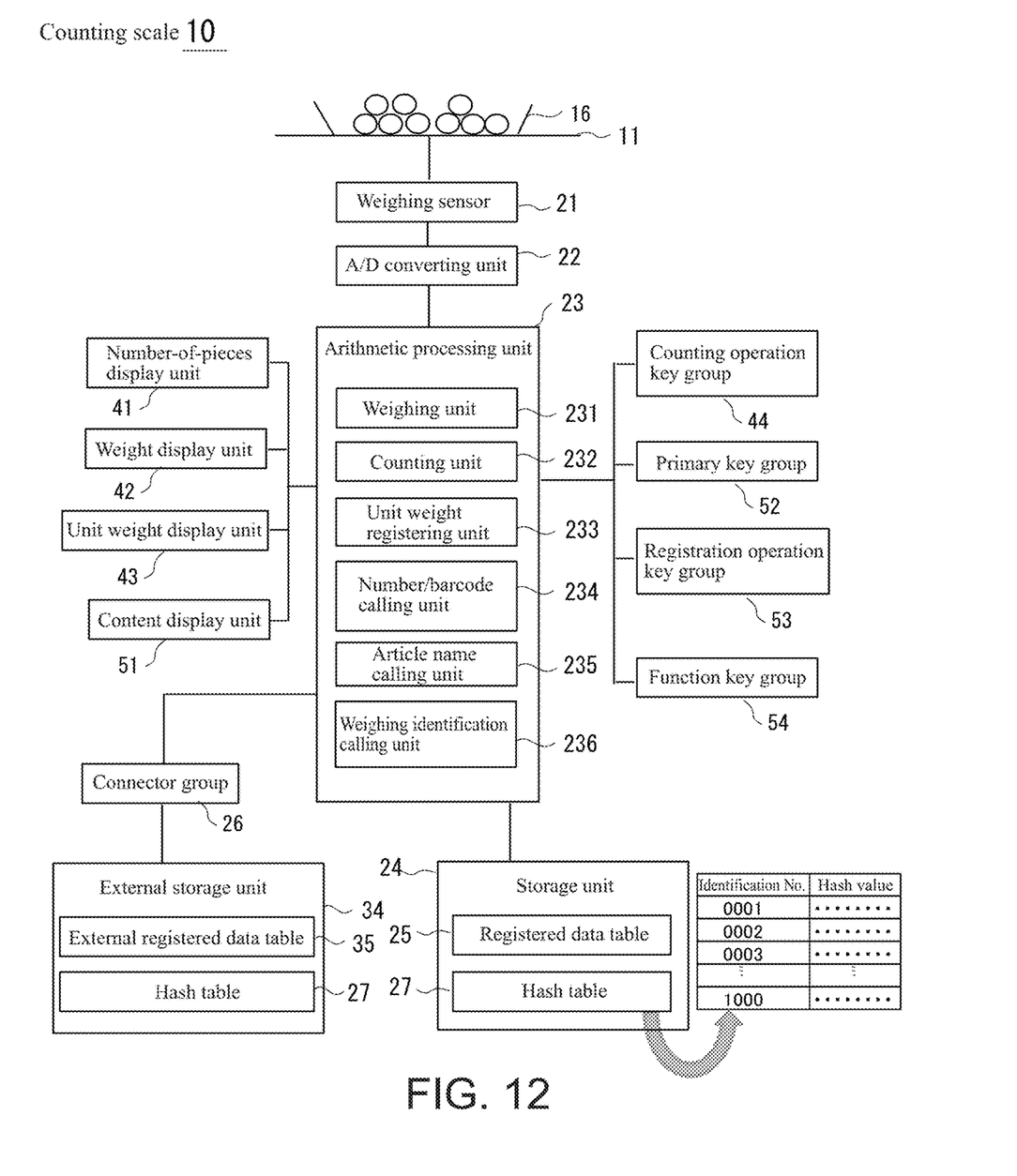
FIG. 12 is a functional configuration block diagram of a counting scale according to a fourth embodiment.

In a fourth embodiment, in the "weighing identification calling," the time to be taken for narrowing-down is further shortened. FIG. 12 is a functional configuration block diagram of a counting scale 10 according to the fourth embodiment. A storage unit 24 (and/or external storage unit 34) of this embodiment further includes a hash table 27. The hash table 27 stores identification information of each article and a hash value obtained by hashing a value of a unit weight by a prescribed hash function, and these are linked to the registered data table 25 (and/or external registered data table 35) by the identification information. The hash table 27 is automatically created when the unit weight registering unit 233 stores (registers) a unit weight in the registered data table 25 (and/or external registered data table 35).

The hash table 27 is used when the weighing identification calling unit 236 narrows down candidate data within a predetermined range with respect to a unit weighed value in "weighing identification calling." That is, in Step S16 or S22 in FIG. 5 (the same applies in FIGS. 8 and 10), the weighing identification calling unit 236 performs a hash search of a value of a unit weight within the predetermined range with respect to the unit weighed value. For example, when a range of within ±1% with respect to a unit weighed value of 101.00 g is set as the predetermined range, respective values of 102.01 g, 102.00 g, 101.99 g, 101.98 g . . . 99.99 g are hashed by the same hash function as in the hash table 27, and unit weights having these hash values are searched for. According to the counting scale 10 of the present embodiment, in "weighing identification calling," quicker narrowing down is enabled.

Preferred embodiments and modifications of the present invention have been described above, and the respective embodiments and modifications can be combined based on knowledge of a person skilled in the art, and such a combined embodiment is included in the scope of the present invention.

REFERENCE SIGNS LIST

10: Counting scale
11: Weighing pan
12: Scale main body
13: Front panel
14: Counting operation panel
15: Registration operation panel
16: Tare container
21: Weighing sensor
23: Arithmetic processing unit
231: Weighing unit
232: Counting unit
233: Unit weight registering unit
234: Number/barcode calling unit
235: Article name calling unit
236: Weighing identification calling unit
24: Storage unit
25: Registered data table
27: Hash table
34: External storage unit
35: External registered data table
51: Content display unit

The invention claimed is:

1. A counting scale comprising:
a weighing pan on which a target article desired to be counted is placed;
a weighing sensor connected to the weighing pan;
a storage unit including a registered data table storing, as registered data, at least a unique identification number, an article name, and a unit weight with respect to one article;

an arithmetic processing unit configured to urge placement of one piece of the target article on the weighing pan, calculate a unit weighed value of the one piece of the target article from the weighing sensor, narrow down registered data including a unit weight within a predetermined range with respect to the unit weighed value as candidate data from the registered data table, and obtain sorted candidate data by selecting and sorting the candidate data in ascending order of absolute value of deviation from the unit weighed value; and a display unit configured to call and display the sorted candidate data for each article in descending order of search ranking.

2. The counting scale according to claim 1, wherein the arithmetic processing unit is connected to an external storage unit including an external registered data table storing, as registered data, at least unique identification information and a unit weight with respect to one article, and narrows down registered data including a unit weight within a predetermined range with respect to the unit weighed value as candidate data from the external registered data table, and calls and displays the candidate data on the display unit in order of listing.

3. The counting scale according to claim 2, wherein the arithmetic processing unit requests to add the target article to be placed on the weighing pan to the requested number of pieces when the unit weighed value is less than a calling lower limit value set in advance, defines an average unit weighed value obtained by dividing a total weighed value of the requested number of pieces of the target article by the requested number of pieces as the unit weighed value, and narrows down the candidate data from the external registered data table.

4. The counting scale according to claim 2, wherein the arithmetic processing unit further sorts the candidate data in any one or a combination of reverse chronological order of the last counting date, descending order of use frequency, and order of routine setting.

5. The counting scale according to claim 1,
wherein the arithmetic processing unit requests to add the target article to be placed on the weighing pan to the requested number of pieces when the unit weighed value is less than a calling lower limit value set in advance, defines an average unit weighed value obtained by dividing a total weighed value of the requested number of pieces of the target article by the requested number of pieces as the unit weighed value, and narrows down the candidate data from the registered data table.

6. The counting scale according to claim 1, wherein the arithmetic processing unit further sorts the sorted candidate data in any one or a combination of reverse chronological order of the last counting date, descending order of use frequency, and order of routine setting.

* * * * *